United States Patent [19]

Kobuke et al.

[11] Patent Number: 4,588,654
[45] Date of Patent: May 13, 1986

[54] MAGNETIC RECORDING MEDIUM

[75] Inventors: Takayoshi Kobuke; Toshiaki Izumi; Seitoku Saito; Kazumasa Fukuda, all of Tokyo, Japan

[73] Assignee: TDK Electronics Co., Ltd., Tokyo, Japan

[21] Appl. No.: 382,775

[22] Filed: May 27, 1982

[30] Foreign Application Priority Data

Jun. 3, 1981 [JP] Japan .................................. 56-84423

[51] Int. Cl.$^4$ ............................................. H01F 10/02
[52] U.S. Cl. ..................... 428/626; 428/458; 428/480; 428/900; 428/928
[58] Field of Search .............. 428/928, 900, 336, 458, 428/480, 626; 204/192 M; 427/131, 132

[56] References Cited

U.S. PATENT DOCUMENTS 4,003,813  1/1977  Hattori et al. .................. 204/192 M

FOREIGN PATENT DOCUMENTS 2402481  7/1974  Fed. Rep. of Germany .

OTHER PUBLICATIONS

IBM Tech Dis. Bull. 8-1964, vol. 7, No. 3, Brownlow et al., pp. 258.

Primary Examiner—Bernard D. Pianalto
Attorney, Agent, or Firm—Oblon, Fisher, Spivak, McClelland & Maier

[57] ABSTRACT

A magnetic recording medium having a subbing metal layer formed by sputtering under a thin magnetic layer formed by vapor deposition possesses excellent magnetic properties and high surface hardness. The presence of the subbing layer improves the adhesion of the thin magnetic layer to the support.

2 Claims, 1 Drawing Figure

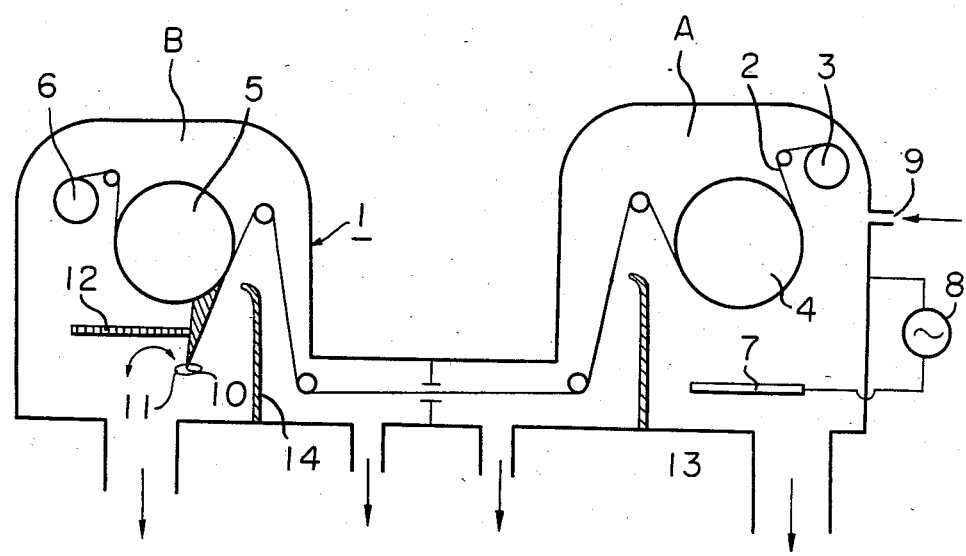

MAGNETIC RECORDING MEDIUM

BACKGROUND OF THE INVENTION

1. Field of the Invention

This invention relates to a magnetic recording medium. More particularly, it relates to a magnetic recording medium composed of a high molecular non-magnetic substrate having formed thereon a subbing layer by sputtering method and a magnetic thin layer formed on the subbing layer by a vacuum deposition method.

2. Description of the Prior Art

Recently, for the purpose of improving recording density, magnetic recording media utilizing magnetic thin layer have been realized.

Conventionally, a magnetic recording tape prepared by coating a polyester film with a uniform dispersion of acicular fine particles of a ferromagnetic oxide or a magnetic metal in an organic solvent together with a binder has been generally used.

It is well known that in such a coating type magnetic recording tape, there is a limit on the recording density by the reasons that the proportion of non-magnetic components contained therein is large, the thickness of the magnetic recording layer can not be reduced over a certain limit, etc.

On the other hand, a method of forming a thin layer of a magnetic metal on a film support by a physical vapor method, such as vacuum vapor deposition, ion plating, sputtering, etc., can be expected to improve the recording density of the magnetic recording medium since the magnetic recording layer can be greatly thinned and almost all the magnetic recording layer is a magnetic component.

However, although the aforesaid method has been studied to commercialize some of these magnetic recording tapes and has been noticed as an effective method to produce thin layer magnetic recording media, in spite of the foregoing facts, the aforesaid method has not been widely used at present because there is a fault about the adhesive property and peeling resistance between the polyester film and the thin magnetic recording layer and hence in the case of using the method for producing a magnetic recording tape, there are problems about the wear resistance and the durability of the magnetic recording tapes.

SUMMARY OF THE INVENTION

This invention has been made in view of the foregoing circumstances and the object of this invention is to provide a magnetic recording tape which minimizes peeling off of the magnetic recording layer caused by a magnetic head, etc., by increasing the adhesion of the thin magnetic recording layer with the polyester film of the magnetic recording medium and can be used without any troubles under ordinary conditions.

The magnetic recording tape of this invention has such a construction that a subbing layer is formed on a non-magnetic high molecular substrate by sputtering for ensuring a strong adhesion and a thin magnetic layer is formed on the subbing layer by oblique vapor deposition.

BRIEF DESCRIPTION OF THE DRAWING

The FIGURE of the accompanying drawing is a schematic view showing an apparatus for preparing the magnetic recording medium of this invention.

DESCRIPTION OF THE PREFERRED EMBODIMENTS

Now, the invention will be practically explained by referring to the embodiment of the apparatus illustrated in the FIGURE of the accompanying drawing and the following examples of this invention. The FIGURE of the accompanying drawing is a schematic view showing an apparatus for preparing the magnetic recording medium of this invention. As shown in the FIGURE, a bell jar 1 is divided into a sputtering chamber A and a vapor deposition chamber B. A base film 2 is supplied from an unwinder 3, is passed along the surface of a cooling drum for sputtering to perform sputtering thereto, enters the vapor deposition chamber B, wherein a magnetic substance is obliquely vapor deposited onto the sputtered layer in vacuo on a cooling drum 5, and then is wound round a winder 6.

In the foregoing bell jar 1, the sputtering chamber A and the vapor deposition chamber B are evacuated separately from each other and the connected portion of the two chambers is also evacuated for meeting the condition in this invention.

In the foregoing sputtering chamber A, a high voltage at a high frequency, e.g., about 2 kilovolts is applied between a target 7 of a non-magnetic material and the bell jar 1 and an argon gas is introduced into the chamber A through a gas inlet 9, whereby the non-magnetic material of the target is sputtered by the argon ion and attaches to the base film 2 on a cooling drum 4.

Also, in the vapor deposition chamber B, a magnetic substance 10 is directly heated by the electron generated from an electron gun 11 and an oblique vapor deposition of the magnetic substance is performed by the aid of a shield plate 12.

In addition, numerals 13 and 14 are barriers for preventing unnecessary deposition.

Then, the effect of this invention is practically explained by the following experimental examples.

EXAMPLE 1

Sputtering condition:
Material for subbing layer: Al
High Voltage: 2 kilovolts
High frequency: 13.56 MHz
Ar gas pressure: $3 \times 10^{-3}$ Torr
Vapor deposition condition:
Material for magnetic layer: Co/Ni
Voltage (electron gun): 10 kilovolts
Electric current (electron gun): 0.5 ampere
Oblique incident angle: 55°
Pressure: $5 \times 10^{-5}$ Torr A magnetic recording tape was prepared by depositing Al and then Co/Ni on a polyester film of 15 μm thick under the foregoing conditions.

EXAMPLE 2

A magnetic recording tape was prepared by the same procedure as above except that Co/Ni was used as the material for the subbing layer formed by sputtering.

Furthermore, a comparison sample for comparing with the foregoing samples of this invention in Examples 1 and 2 was prepared by forming the subbing layer by vapor deposition without employing the sputtering method. The conditions for preparing the comparison sample were as follows:
Comparison example:
Material for subbing layer: Al Material for magnetic layer: Co/Ni
Vapor deposition condition:
Voltage (electron gun): 10 kilovolts
Electric current (electron gun): 0.5 ampere
Oblique incident angle: 55°
Pressure: $5 \times 10^{-5}$ Torr Each of the samples obtained in foregoing Examples 1 and 2 and Comparison example was measured about the surface hardness of the thin magnetic layer by means of a scrach tester by the hardness of pencil and about the magnetic characteristics by means of VSM. The results are shown in Table 1.

TABLE 1

| Sample | Example 1 | Example 2 | Comparison example |
|---|---|---|---|
| Subbing layer | Al (sputtering) | Co/Ni (sputtering) | Al (vapor deposition) |
| Magnetic layer | Co/Ni | Co/Ni | Co/Ni |
| Hc | 600 | 610 | 600 |
| Squareness ratio | 0.90 | 0.91 | 0.90 |
| Surface hardness | 6H | 6H | 3H |

As is clear from the results shown in the aforesaid Table 1, it was confirmed that the surface hardness of the sample having the subbing layer formed by a sputtering method was higher than that of the sample having the subbing layer formed by a vapor deposition method.

As explained before in detail, the magnetic recording medium of this invention had excellent magnetic characteristics as well as excellent abrasion resistance and durability, which are very preferred for magnetic recording tape for practical purposes.

We claim:

1. A magnetic recording medium comprising a high molecular-weight polyester resin substrate having thereon, in succession, a sub-layer of aluminum or Co/Ni metal formed by a sputtering method, and a thin magnetic layer formed by a vapor deposition method, thereby imparting a surface hardness to said magnetic recording medium which is substantially greater than that of a magnetic recording medium in which the sub-layer and thin magnetic layer are both formed by a vapor deposition method.

2. The magnetic recording medium of claim 1, wherein the thin magnetic layer is a Co/Ni layer.

* * * * *